US009544482B2

(12) United States Patent
Bang et al.

(10) Patent No.: US 9,544,482 B2
(45) Date of Patent: Jan. 10, 2017

(54) OPTICAL ADJUSTING APPARATUS

(71) Applicant: SAMSUNG ELECTRONICS CO., LTD., Suwon-si, Gyeonggi-do (KR)

(72) Inventors: Jin-young Bang, Anyang-si (KR); Jung-ho Park, Changwon-si (KR); Kyung-bae Lee, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 14/476,014

(22) Filed: Sep. 3, 2014

(65) Prior Publication Data

US 2015/0146025 A1    May 28, 2015

(30) Foreign Application Priority Data

Nov. 25, 2013    (KR) .................. 10-2013-0143842

(51) Int. Cl.
*H04N 5/225* (2006.01)
*G02B 7/08* (2006.01)
*H04N 5/232* (2006.01)
*G02B 27/64* (2006.01)

(52) U.S. Cl.
CPC .............. *H04N 5/2254* (2013.01); *G02B 7/08* (2013.01); *G02B 27/646* (2013.01); *H04N 5/23212* (2013.01); *H04N 5/23248* (2013.01)

(58) Field of Classification Search
CPC ......... G03B 13/00; G02B 27/646; G02B 7/08; H04N 5/2257; H04N 5/2254; H04N 5/23212; H04N 5/23248; H04N 5/232
USPC ........... 348/208.99, 208.2, 208.12, 345, 374; 396/79, 55
See application file for complete search history.

(56) References Cited

U.S. PATENT DOCUMENTS

| 7,881,598 | B1 | 2/2011 | Wu et al. |
| 7,974,528 | B2 | 7/2011 | Chou |
| 8,462,451 | B2 * | 6/2013 | Okuda ............... G02B 7/02 359/823 |
| 8,818,181 | B1 * | 8/2014 | Hwang .............. H04N 5/2254 324/207.2 |
| 2012/0105960 | A1 * | 5/2012 | Park .................. G02B 27/646 359/554 |

(Continued)

FOREIGN PATENT DOCUMENTS

| JP | 2005-241982 A | 9/2005 |
| JP | 2012-093558 A | 5/2012 |

(Continued)

OTHER PUBLICATIONS

Extended European Search Report issued for EP 14185416.6 (Apr. 15, 2015).

*Primary Examiner* — Tuan Ho
*Assistant Examiner* — Marly Camargo
(74) *Attorney, Agent, or Firm* — Drinker Biddle & Reath LLP

(57) ABSTRACT

An optical adjusting apparatus having an optical adjusting lens to perform image stabilization and auto focusing includes a base supporting a lens barrel on which the optical adjusting lens is mounted, a first driver to move the lens barrel in a first direction, a plurality of first ball bearings disposed between the base and the first driver, a second driver to move the lens barrel in a second direction that is perpendicular to the first direction, and a plurality of second ball bearings disposed between the first driver and the second driver.

29 Claims, 12 Drawing Sheets

(56) References Cited

U.S. PATENT DOCUMENTS

| | | |
|---|---|---|
| 2012/0307088 A1 | 12/2012 | Han |
| 2013/0027602 A1 | 1/2013 | Kasuga |
| 2013/0039640 A1 | 2/2013 | Sekimoto |
| 2013/0070148 A1 | 3/2013 | Kim |
| 2013/0076924 A1 | 3/2013 | Wade et al. |
| 2013/0088607 A1 | 4/2013 | Akutsu et al. |
| 2013/0089311 A1 | 4/2013 | Jung et al. |
| 2013/0170039 A1* | 7/2013 | Miyoshi ............... G02B 27/646 359/554 |
| 2015/0049209 A1* | 2/2015 | Hwang ............. H04N 5/23287 348/208.11 |
| 2015/0116514 A1* | 4/2015 | Kim .................... G02B 27/646 348/208.4 |
| 2016/0241787 A1* | 8/2016 | Sekimoto ............. H04N 5/2257 |
| 2016/0246069 A1* | 8/2016 | Kim .................... G02B 27/646 |

FOREIGN PATENT DOCUMENTS

| | | | |
|---|---|---|---|
| JP | 2012093558 A | * | 5/2012 |
| KR | 10-0980794 B1 | | 9/2010 |
| KR | 10-2012-0133905 A | | 12/2012 |

\* cited by examiner

OPTICAL ADJUSTING APPARATUS

CROSS-REFERENCE TO RELATED APPLICATIONS

This application claims priority under 35 U.S.C. §119(a) from Korean Patent Application No. 10-2013-0143842, filed in the Korean Intellectual Property Office on Nov. 25, 2013, the disclosure of which is incorporated herein by reference.

BACKGROUND OF THE INVENTION

1. Field of the Invention

Methods and apparatuses consistent with the exemplary embodiments relate to an optical adjusting apparatus, and more particularly to an optical adjusting apparatus where an optical image stabilizer function and an auto focusing function have been integrated.

2. Description of the Related Art

Recently, in the field of electronic devices such as smart phones, slimness is emerging as the main topic or design goal. In order to make such electronic devices slimmer, various attempts are being made to make various components that are mounted inside the electronic devices slimmer. For example, there is a tendency of designing optical adjusting apparatuses to be included in camera modules such that an image stabilization function and an auto focusing function are provided in one module.

Conventional optical adjusting apparatuses designed to include an image stabilization function and an auto focusing function integrated in one module provide power to an image stabilization driver through a suspension wire supporting the image stabilization driver.

However, conventional optical adjusting apparatuses are much affected by component deviations of suspension wires, and current consumption is also a problem. Furthermore, in conventional optical adjusting apparatuses, when the image stabilization driver moves, due to the suspension wire, tilt may occur in the entirety of the apparatus, thereby decreasing the resolution which is a problem.

SUMMARY OF THE INVENTION

Exemplary embodiments of the present general inventive concept provide an optical adjusting apparatus where an image stabilization function and an auto focusing function are integrated while resolve the aforementioned problems.

Additional features and utilities of the present general inventive concept will be set forth in part in the description which follows and, in part, will be obvious from the description, or may be learned by practice of the general inventive concept.

Exemplary embodiments of the present general inventive concept provide an optical adjusting apparatus having an optical adjusting lens to perform image stabilization and auto focusing, the apparatus including a base supporting a lens barrel on which the optical adjusting lens is mounted, a first driver to move the lens barrel in a first direction, a plurality of first ball bearings disposed between the base and the first driver, a second driver to move the lens barrel in a second direction that is perpendicular to the first direction, and a plurality of second ball bearings disposed between the first driver and the second driver.

The first driver may be disposed between the base and the second driver.

The lens barrel may be mounted on the second driver.

The first direction may be a direction perpendicular to an optical axis direction of the optical adjusting lens, and the second direction may be the optical axis direction of the optical adjusting lens.

The first driver may include an image stabilization base to moveably support the second driver, and an image stabilization extender extending from the image stabilization base in the optical axis direction.

The plurality of first ball bearings may be disposed between the image stabilization base and the base.

A plurality of first ball bearing accommodating grooves to slidably accommodate the plurality of first ball bearings may be formed in the base, and the first ball bearings may slidably support one surface of the image stabilization base opposite a front surface of the base.

The plurality of second ball bearings may be disposed between the second driver and the image stabilization extender.

A plurality of second ball bearing accommodating grooves that slidably accommodate the plurality of second ball bearings may be formed in the image stabilization extender, and the plurality of second ball bearings may slidably support one surface of the second driver opposite a front surface of the image stabilization extender.

The plurality of second ball bearing accommodating grooves may include a plane groove extending along the optical axis direction, and a V-shaped groove distanced from the plane groove by a predetermined distance and extending along the optical axis direction.

The first direction may be an optical axis direction of the optical adjusting lens, and the second direction may be a direction perpendicular to the optical axis direction.

The first driver may include an auto focusing base to moveably support the second driver, and an auto focusing extender extending from the auto focusing base in the optical axis direction.

The base may include a lower base, and a side base extending from the lower base in the optical axis direction.

The plurality of first ball bearings may be disposed between the auto focusing extender and the side base.

A plurality of first ball bearing accommodating grooves to slidably accommodate the plurality of first ball bearings may be formed in the side base, and the plurality of first ball bearings may slidably support one surface of the auto focusing extender opposite a front surface of the side base.

The plurality of second ball bearings may be disposed between the second driver and the auto focusing base.

A plurality of second ball bearing accommodating grooves to slidably accommodate the plurality of second ball bearings may be formed in the auto focusing bearing, and the plurality of second ball bearings may slidably support one surface of the second driver opposite a front surface of the auto focusing base.

The number of the plurality of first ball bearings and the plurality of second ball bearings may be at least three, respectively.

Exemplary embodiments of the present general inventive concept also provide an optical adjustment apparatus, including a base, a first driver mounted on the base, the first driver being supported by a plurality of first ball bearings to be movable in a first direction relative to the base, a second driver mounted on the first driver and moving in the first direction with the first driver, the second driver being supported by a plurality of second ball bearings to be movable in a second direction relative to the base, the second direction being perpendicular to the first direction, and an optical adjusting lens disposed on the second driver, the optical adjusting lens having an optical axis direction corresponding to one of the first and second directions.

Exemplary embodiments of the present general inventive concept also provide an optical adjustment apparatus, including a base, a lens barrel having a lens, a first driver supported by the base, a second driver supported by the first driver, the second driver supporting the lens barrel, a first bearing disposed between the base and the first driver to be movable in a first direction, and a second bearing disposed between the first driver and the second driver to be movable in a second direction.

The apparatus may further include a first groove formed in a surface of the base in the first direction to accommodate the first bearing, and a second groove formed in a surface of the first driver in the second direction to accommodate the second bearing.

The first groove may include a plurality of first grooves formed in the surface of the base, and at least one of the plurality of first grooves may be configured to restrict movement of the first driver in the second direction.

The second groove may include a plurality of second grooves formed in the surface of the first driver, and at least one of the plurality of second grooves may be configured to restrict movement of the second driver in the first direction.

The second direction may be along an X-Y plane perpendicular to an optical axis of the lens. The second driver may include a first actuator to control movement of the second driver along the X axis of the X-Y plane, and a second actuator to control movement of the second driver along the Y axis of the X-Y plane.

The apparatus may further include an actuator to control movement of the first driver in the first direction, the actuator controlling the movement of the first driver by interacting with a yoke disposed on the base.

The apparatus may further include an actuator to control movement of the second driver in the second direction, the actuator controlling the movement of the second driver by interacting with a yoke disposed on the first driver.

The apparatus may further include a first detector to detect movement of the first driver in the first direction, the first detector disposed on the base, and a second detector to detect movement of the second driver in the second direction, the second detector being disposed on the first driver.

The first direction may be along an X-Y plane perpendicular to an optical axis of the lens, and the first detector may include a plurality of first detectors, one of the first detectors detecting movement of the first driver along the X axis of the X-Y plane, and another of the first detectors detecting movement of the first driver along the Y axis of the X-Y plane.

The second direction may be along an X-Y plane perpendicular to an optical axis of the lens, and the second detector may include a plurality of second detectors one of the second detectors detecting movement of the second driver along the X axis of the X-Y plane, and another of the second detectors detecting movement of the second driver along the Y axis of the X-Y plane.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
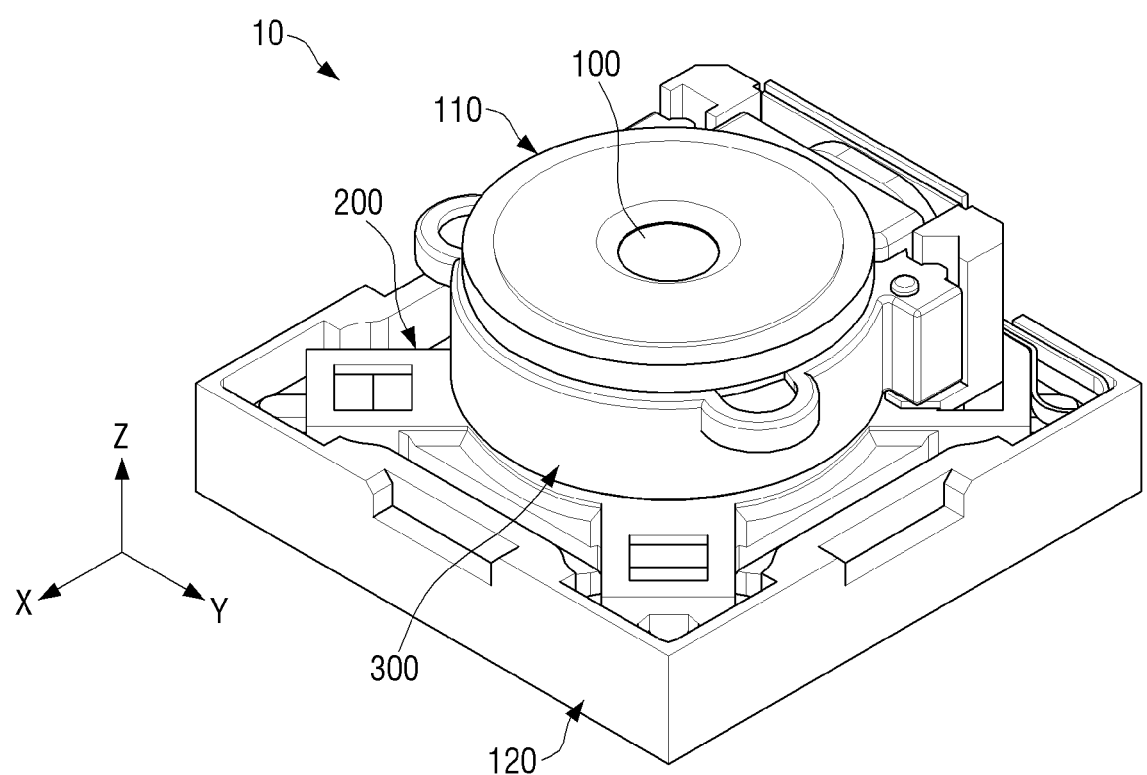
FIG. 1 is a skewed view of an optical adjusting apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

In the following description, directional terms such as "upper" and "lower" are made with reference to the orientation of the elements in the associated drawings. It will be understood that these terms are used to describe relative location, and may be changed depending on the orientation and configuration of the particular exemplary embodiment.

Figure 2:
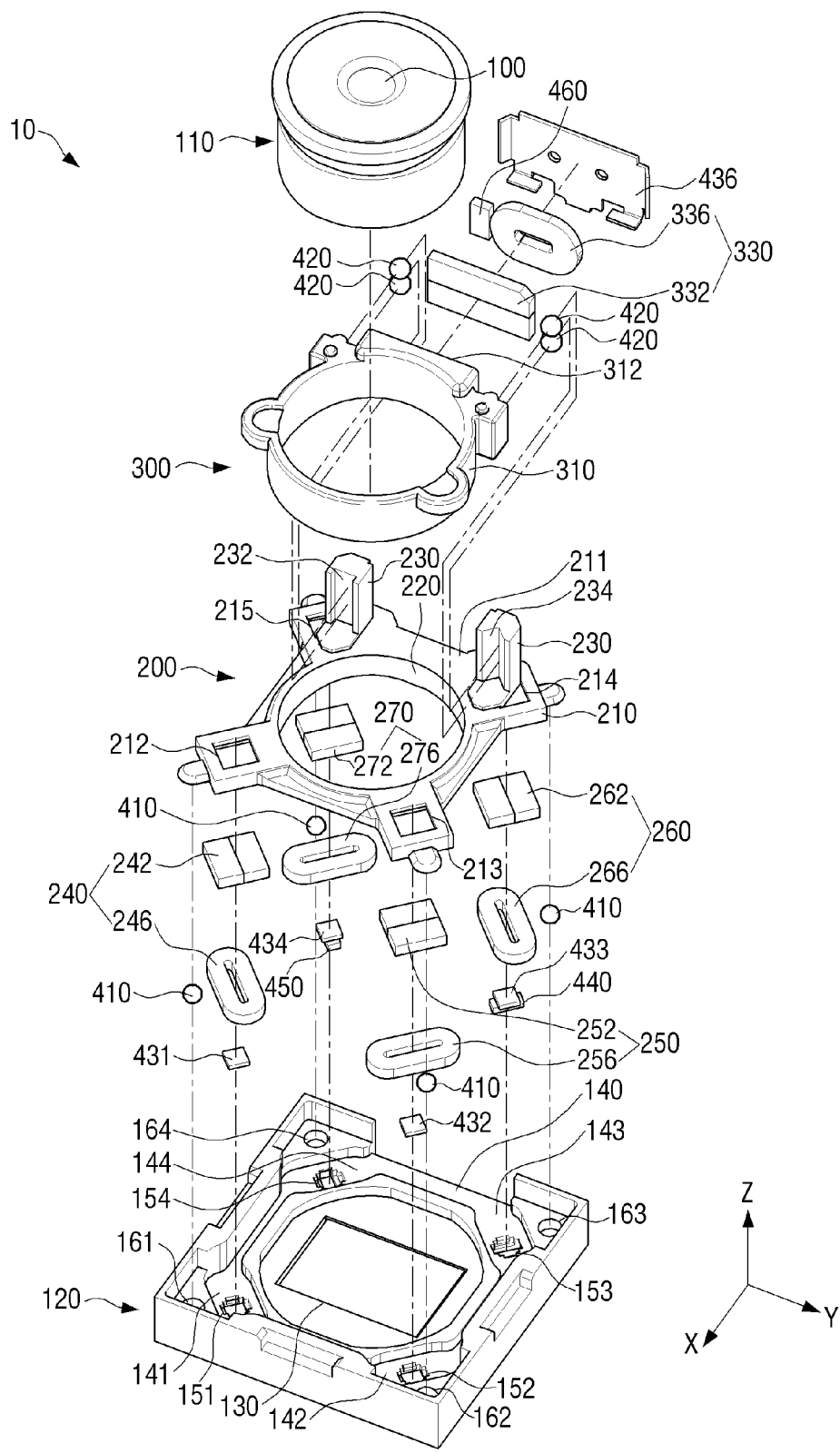
FIG. 2 is an exploded skewed view of the optical adjusting apparatus of FIG. 1.

FIG. 1 is a skewed view of an optical adjusting apparatus 10 according to an exemplary embodiment of the present general inventive concept, and FIG. 2 is an exploded skewed view of the optical adjusting apparatus 10 of FIG. 1.

Referring to FIGS. 1 and 2, the optical adjusting apparatus 10 includes an optical adjusting lens 100, a lens barrel 110, a base 120, a first driver 200, a second driver 300, a first ball bearing 410 and a second ball bearing 420.

The optical adjusting apparatus 10 is a module to perform an image stabilization function to prevent deterioration of the definition of an image caused by a user's hand trembling and an auto focusing function to automatically adjust the focus of the image. Generally, a camera module having a camera function is provided with a separate module having the image stabilization function and the auto focusing function, and thus due to the volume of each module, such a camera module is not suitable to fit in small electronic devices such as for example smart phones. Thus, optical adjusting apparatuses where the abovementioned functions are integrated are being mounted on small electronic devices.

The optical adjusting lens 100 either moves on a first and second axis plane (X-Y plane) to perform an image stabilization or on an optical axis plane (Z plane) to perform an auto focusing through driving of a first driver 200 or second driver 300 to be explained hereinbelow.

The lens barrel 110 accommodates the optical adjusting lens 100, and has a shape of a cylinder. The lens barrel 110 is provided with an opening (not illustrated) that has a hollow center in an optical axis direction (Z axis direction) so that light can penetrate. While accommodating the optical adjusting lens 100, the lens barrel 110 is moveable in a first direction (defined herein as along a plane formed by the X and Y axes, or the X-Y plane) that is perpendicular to an optical axis direction (Z axis direction) and in a second direction (defined herein as the Z axis direction) that is the optical axis direction.

The base 120 forms a bottom of the optical adjusting apparatus 10, and supports the lens barrel 110 where the optical adjusting lens 100 is mounted and various components of the optical adjusting apparatus 10. Furthermore, as will be explained hereinbelow, the base 120 supports the first driver 200 such that the first driver 200 is moveable in a first direction (along the X-Y plane) that is perpendicular to the optical axis direction (Z axis direction).

In such a base 120, there are formed a first penetrating hole 130, image stabilization driver accommodating groove 140, a plurality of yoke mounting grooves 151, 152, 153, and 154, and a plurality of first ball bearing accommodating grooves 161, 162, 163, and 164).

The first penetrating hole 130 is formed in a center of an interior of the base 120 so that it can be penetrated by the light that has penetrated the optical adjusting lens 100.

On the image stabilization accommodating groove 140, a plurality of image stabilization drivers 246, 256, 266, and 276 are mounted. Such an image stabilization driver accommodating groove 140 is formed in the base 120 to surround the first penetrating hole 130. In four corners of the image stabilization driver accommodating grooves 140, a plurality of accommodating grooves 141, 142, 143, and 144 are respectively formed, each accommodating a corresponding one of the image stabilization drivers 246, 256, 266, and 276. In the present exemplary embodiment, four first to fourth accommodating grooves 141, 142, 143, and 144 are respectively formed to correspond to each of four first to fourth image stabilization drivers 246, 256, 266, and 276 that will be explained hereinbelow.

On the plurality of yoke mounting grooves 151, 152, 153, and 154, a plurality of yokes 431, 432, 433, and 434 that will be explained hereinbelow are respectively mounted. Such a plurality of yoke mounting grooves 151, 152, 153, and 154 are respectively formed in first to fourth accommodating grooves 141, 142, 143, and 144. In the present exemplary embodiment, four first to fourth yoke mounting grooves 151, 152, 153, and 154 are formed each respectively corresponding to each of four first to fourth yokes 431, 432, 433, and 434 that will be explained hereinbelow. Each of these first to fourth yoke mounting grooves 151, 152, 153, and 154 is respectively formed in each of the first to fourth accommodating grooves 141, 142, 143, and 144. Meanwhile, on at least two yoke mounting grooves 153, 154 of the first to fourth yoke mounting grooves 151, 152, 153, and 154, a plurality of detectors 440, 450 that will be explained hereinbelow are additionally mounted.

A plurality of first ball bearing accommodating grooves 161, 162, 163, and 164 accommodate a plurality of first ball bearings 410 such that the plurality of first ball bearings 410 can slide. In the present exemplary embodiment, there are four first ball bearings 410, and thus there are also provided four first ball bearing accommodating grooves 161, 162, 163, and 164 corresponding thereto. Each of the four first ball bearing accommodating grooves 161, 162, 163, and 164 is respectively formed in an inner corner of the base 120.

The first driver 200 moves the lens barrel 110 on which the optical adjusting lens 100 is mounted in a first direction (along the X-Y plane). The first driver 200 is disposed between the base 120 and the second driver 300.

Such a first driver 200 may include an image stabilization base 210, image stabilization extender 230 and a plurality of image stabilization actuators.

The image stabilization base 210 supports the second driver 300 on which a lens barrel 110 is mounted such that the second driver 300 can move in a second direction (Z axis direction) during an auto focusing. In addition, the image stabilization base 210 also moves in a first direction (along the X-Y plane) together with the lens barrel 110 during an image stabilization. Furthermore, in the image stabilization base 210, there is formed a second penetrating hole 220 so that light that has penetrated the optical adjusting lens 100 can penetrate.

The image stabilization extender 230 is formed in one side of an upper surface 211 of the image stabilization base 210. The image stabilization extender 230 has the shape of a pillar, and two image stabilization extenders 230 may be distanced from each other and extend along the optical axis direction (Z axis direction).

In such an image stabilization extender 230, a plurality of second ball bearing accommodating grooves 232, 234 are formed. Such a plurality of second ball bearing accommodating grooves 232, 234 may include a plane groove 232 extending along the optical axis direction (Z axis direction) and a V-shaped groove 234 distanced by a predetermined distance from the plane groove 232 and extending along the optical axis direction (Z axis direction).

The plane groove 232 guides smooth sliding of the plurality of second ball bearings 420. The V-shaped groove 234 prevents left-right sliding that may occur during an up-down sliding of the plurality of second ball bearings 420. If all of the plurality of second ball bearing accommodating grooves 232, 234 are plane grooves 232, it is not possible to prevent left-right sliding that may occur during up-down sliding. Furthermore, if all of the plurality of second ball bearing accommodating grooves 232, 234 are V-shaped grooves 234, the sliding of the plurality of second ball bearings 420 may be stopped during up-down sliding due to friction between the plurality of second ball bearings 420 and the V-shaped grooves 234. Therefore, the plurality of second ball bearing accommodating grooves 232, 234 are configured to have both the plane groove 232 and the V-shaped groove 234 so as to provide smooth up-down sliding of the plurality of second ball bearings 420 in the Z axis direction and to prevent left-right sliding thereof in the X-Y plane. At least one of the second ball bearing accommodating grooves 232, 234 may have a shape to restrict a movement of the second driver 300 in the X-Y plane.

The plurality of image stabilization actuators are disposed to move the lens barrel 110, second driver 300 and image stabilization base 210 in a first direction (along the X-Y plane) for an image stabilization. These image stabilization actuators may include first to fourth image stabilization actuators 240, 250, 260, 270.

Each of the first to fourth image stabilization actuators 240, 250, 260, and 270 may include corresponding ones of first to fourth image stabilization magnets 242, 252, 262, and 272 and first to fourth image stabilization drivers 246, 256, 266, and 276, respectively.

Each of the first to fourth image stabilization magnets 242, 252, 262, and 272 is respectively mounted on one of first to fourth image stabilization magnet mounting grooves 212, 213, 214, and 215 formed in the image stabilization base 210.

Each of a first to fourth image stabilization drivers 246, 256, 266, and 276 is respectively mounted on one of first to fourth accommodating grooves 141, 142, 143, and 144 of the image stabilization driver accommodating groove 140 formed in the base 120. Each of the first to fourth image stabilization drivers 246, 256, 266, and 276 is disposed in a location opposite the first to fourth image stabilization magnets 242, 252, 262, and 272, respectively. More specifically, each of the first to fourth image stabilization drivers 246, 256, 266, and 276 is respectively disposed in a lower part of one of the first to fourth image stabilization magnets 242, 252, 262, 272, respectively.

These first to fourth image stabilization drivers 246, 256, 266, and 276 may include coils that may receive current from outside the optical adjustment apparatus 10 and generate electromagnetic force. Accordingly, each of the first to fourth image stabilization drivers 246, 256, 266, and 276 performs electromagnetic interaction with the first to fourth image stabilization magnets 242, 252, 262, and 272, respectively.

Accordingly, the first and third image stabilization actuators 240, 260 may provide driving power in an X axis direction that is included in the first direction, and move the lens barrel 100, second driver 300, and image stabilization base 210 in the X axis direction. In addition, the second and fourth image stabilization actuators 250, 270 may provide driving power in a Y axis direction that is also included in the first direction, and move the lens barrel 110, second driver 300 and image stabilization base 210 in the Y axis direction.

The second driver 300 moves the lens barrel 100 on which the optical adjusting lens 100 is mounted in a second direction (Z axis direction, or optical axis direction) that is perpendicular to the first direction (along the X-Y plane). Such a second driver 300 may include an auto focusing base 310 and an auto focusing actuator 330.

On the auto focusing base 310, the lens barrel 110 is mounted. The auto focusing base 310 on which the lens barrel 310 is mounted is mounted on the first driver 200 such that it may move along the second direction (Z axis direction) during an auto focusing.

The auto focusing actuator 330 moves the lens barrel 110 and the second driver 300 in the second direction (Z axis direction) for an auto focusing. Such an auto focusing actuator 330 may include an auto focusing magnet 332 and auto focusing driver 336.

The auto focusing magnet 332 is mounted on an auto focusing magnet mounting groove 312 of the auto focusing base 310. The auto focusing driver 336 is disposed in a location opposite the auto focusing magnet 332. The auto focusing driver 336 may be made of coil that may receive current from outside the optical adjustment apparatus 10 and generate electromagnetic force such as the aforementioned first to fourth image stabilization drivers 246, 256, 266, 276.

Accordingly, the auto focusing actuator 330 may provide driving power in the second direction (Z axis direction) that is the optical axis direction (Z axis direction) and move the lens barrel 110 and the second driver 300 in the second direction.

The first ball bearing 410 may be provided in plural, and may be disposed between the base 120 and the first driver 200. In the present exemplary embodiment, the number of the plurality of first ball bearings 410 may be four. Since the ball bearings are in point contact with a bottom of the first driver 200, in order to prevent the driver 200 from sliding in an unwanted direction, there must be at least three ball bearings. Accordingly, in the present exemplary embodiment, there are four first ball bearings 410. However, this is just an example, and thus there may be three first ball bearings 410 depending on the design of the first ball bearing.

Each of the four first ball bearings 410 is slidably mounted on a corresponding one of the four first ball bearing accommodating grooves 161, 162, 163, and 164 of the base 120. Accordingly, the four first ball bearings 410 slidably support a bottom of the first driver 200 opposite an upper surface of the base 120 that corresponds to a bottom of the image stabilization base 210.

Therefore, in the optical adjusting apparatus 10 of the present exemplary embodiment, when a hand trembling occurs, the image stabilization base 210 moves in the first direction (along the X-Y plane), thereby moving the second driver 300 and the lens barrel 110 in the first direction (along the X-Y plane) as well, performing an image stabilization such that an image from data obtained from an imaging element (not illustrated) can be clarified.

The second ball bearing 420 may be provided in plural, and disposed between the first driver 200 and second driver 300. As in the aforementioned plurality of first ball bearings 410, the number of the plurality of second ball bearings 420 is four in the illustrated exemplary embodiment, but depending on the design, three second ball bearings 420 may be provided.

Four second ball bearings 420 are slidably mounted, two on the plane groove 232 and the other two on the V-shaped groove 234 of the image stabilization extender 230. Accordingly, the four second ball bearings 420 slidably support a rear surface of the auto focusing base 310 of the second driver 300 opposite a front surface of the image stabilization extender 230 of the first driver 200.

Therefore, in the case of an auto focusing, the optical adjusting apparatus 10 according to the present exemplary embodiment may move the second driver 300 in the second direction (Z axis direction) that is the optical axis direction (Z axis direction) to move the lens barrel 110 in the second direction (Z axis direction) that is the optical axis direction (Z axis direction) as well, performing an auto focusing.

Meanwhile, the optical adjusting apparatus 10 may further include a plurality of yokes and a plurality of detectors.

The plurality of yokes may include first to fifth yokes 431, 432, 433, 434, and 436.

Each of the first to fourth yokes 431, 432, 433, and 434 is mounted on a corresponding one of the first to fourth yoke mounting grooves 151, 152, 153, and 154 of the base 120, respectively. Each of the first to fourth yokes 431, 432, 433, and 434 is disposed in a location opposite a corresponding one of the first to fourth image stabilization magnets 242, 252, 262, and 272, respectively. The first to fourth yokes 431, 432, 433, and 434 and the first to fourth image stabilization magnets 242, 252, 262, and 272 provide magnetic gravitation to each other.

Accordingly, the optical adjusting apparatus 10 may make the image stabilization base 210 of the first driver 200 closely contact the base 120 and also make the image stabilization base 210 of the first driver 200 return to its initial location by the gravitation formed between the first to fourth yokes 431, 432, 433, and 434.

A fifth yoke 436 is mounted on the image stabilization base 210 of the first driver. The fifth yoke 436 is disposed in a location opposite the auto focusing magnet 332. The fifth yoke 436 and the auto focusing magnet 332 provide magnetic gravitation to each other.

Accordingly, the optical adjusting apparatus 10 may make the auto focusing base 310 of the second driver 300 closely contact the fifth yoke 436 and also make the image stabilization base 210 of the first driver 200 return to its initial location by the gravitation formed between the first to fourth yokes 431, 432, 433, and 434.

The plurality of detectors may include a first detector 440, second detector 450, and third detector 460.

The first detector 440 is mounted on the third yoke mounting groove 153 of the base 120 below the third yoke 433. The first detector 440 is disposed opposite the third image stabilization magnet 262 with the third image stabilization driver 266 in between. The first detector 440 detects movement in the X axis direction that is included in the first direction of the lens barrel, and may include a hole sensor configured to sense change of size of current or voltage induced according to the intensity of magnetic field. Depending on the particular exemplary embodiment, the first detector 440 may be mounted on the first yoke mounting groove 151 provided opposite the third yoke mounting groove 153 instead of the third yoke mounting groove 153. Alternatively, two first detectors 440 may each be mounted on the first and third yoke mounting grooves 151, 153, respectively.

The second detector 450 is mounted on the fourth yoke mounting groove 154 of the base 120 below the fourth yoke 434. The second detector 450 is disposed opposite the fourth image stabilization magnet 272 with the fourth image stabilization driver 276 in between. The second detector 450 detects movement in the Y axis direction that is included in the first direction of the lens barrel 110, and the second detector 450 may include a hole sensor as in the first detector 440. Depending on the particular exemplary embodiment, the second detector 450 may be mounted on the second yoke mounting groove 152 provided opposite the fourth yoke mounting groove 154 instead of the fourth yoke mounting groove 154. Alternatively, two second detectors 450 may be mounted each on the second and fourth yoke mounting grooves 152, 154, respectively.

The third detector 460 is provided in front of the fifth yoke 436, and disposed opposite the auto focusing magnet 332. The third detector 460 may detect movement in the second direction (Z axis direction) of the lens barrel 110, and may include a hole sensor as in the first and second detectors 440, 450.

The optical adjusting apparatus 10 according to the present exemplary embodiment may control movement of the lens barrel 110 to a desired location based on the location of the lens barrel 110 detected in the first to third detectors 440, 450, 460.

Hereinbelow is further detailed explanation on an arrangement of the first and second ball bearings 410, 420.

Figure 3:
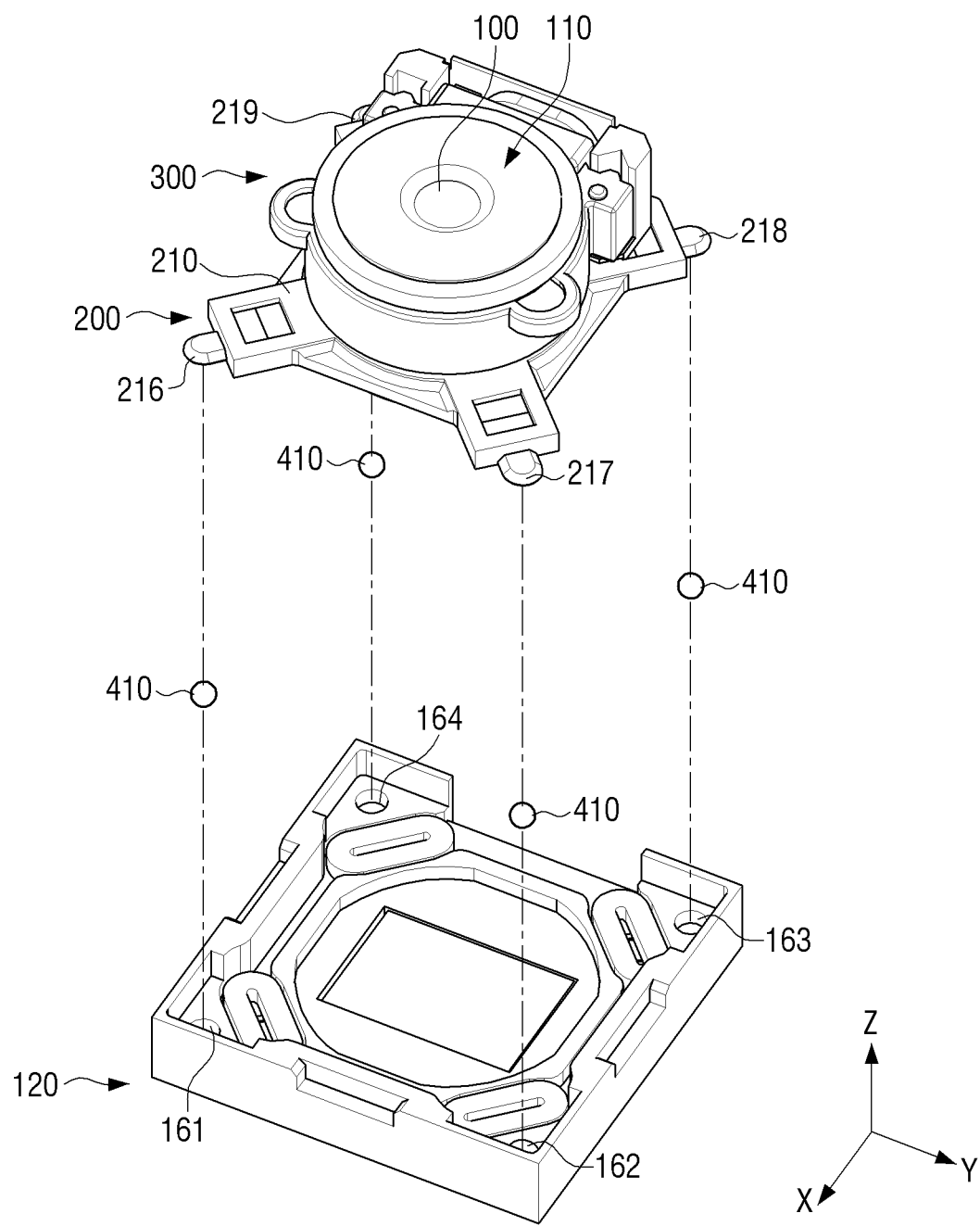
FIG. 3 is a view illustrating a combining of a base and a first driver of the optical adjusting apparatus of FIG. 1.
Figure 4:
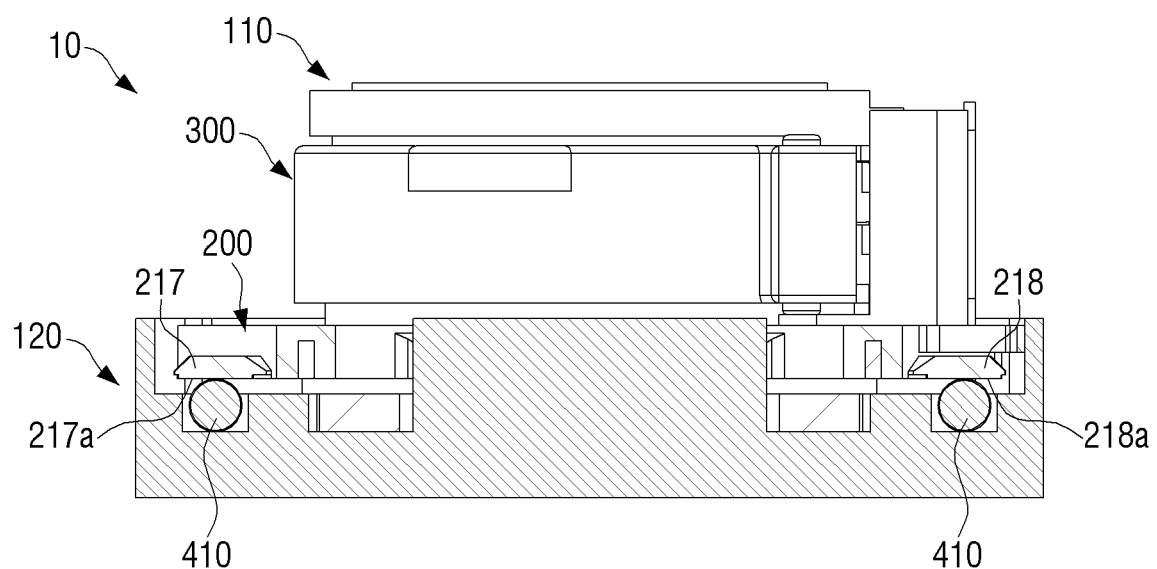
FIG. 4 is a cross-sectional view illustrating an arrangement of a first ball bearing of the optical adjusting apparatus of FIG. 1.

FIG. 3 is a view illustrating a combining of the base 120 and the first driver 200 of the optical adjusting apparatus 10 of FIG. 1, and FIG. 4 is a cross-sectional view illustrating an arrangement of the first ball bearing 410 of the optical adjusting apparatus 10 of FIG. 1.

Referring to FIGS. 3 and 4, the first driver 200 is mounted on the base 120 such that it can slide in the first direction (along the X-Y plane) with the second driver 300 and the lens barrel 110 accommodating the optical adjusting lens 100 mounted thereon. Herein, between the base 120 and the first driver 200, four first ball bearings 410 are disposed as aforementioned.

Each of the four first ball bearings 410 is slidably accommodated in a corresponding one of the four first ball bearing accommodating grooves 161, 162, 163, and 164, respectively, and contacts a corresponding one of the four first ball bearing contacts 216, 217, 218, and 219 formed in the image stabilization base 210 of the first driver. Referring to FIG. 4, it can be seen that two first ball bearings 410 contact and support the bottoms 217a, 218a of the two first ball bearing contacts 217, 218.

Accordingly, when performing an image stabilization, the four first ball bearings 410 support the bottom of the second driver 200 opposite the upper surface of the base 120 such that the bottom of the second driver 200 can slide in the first direction (along the X-Y plane).

Figure 5:
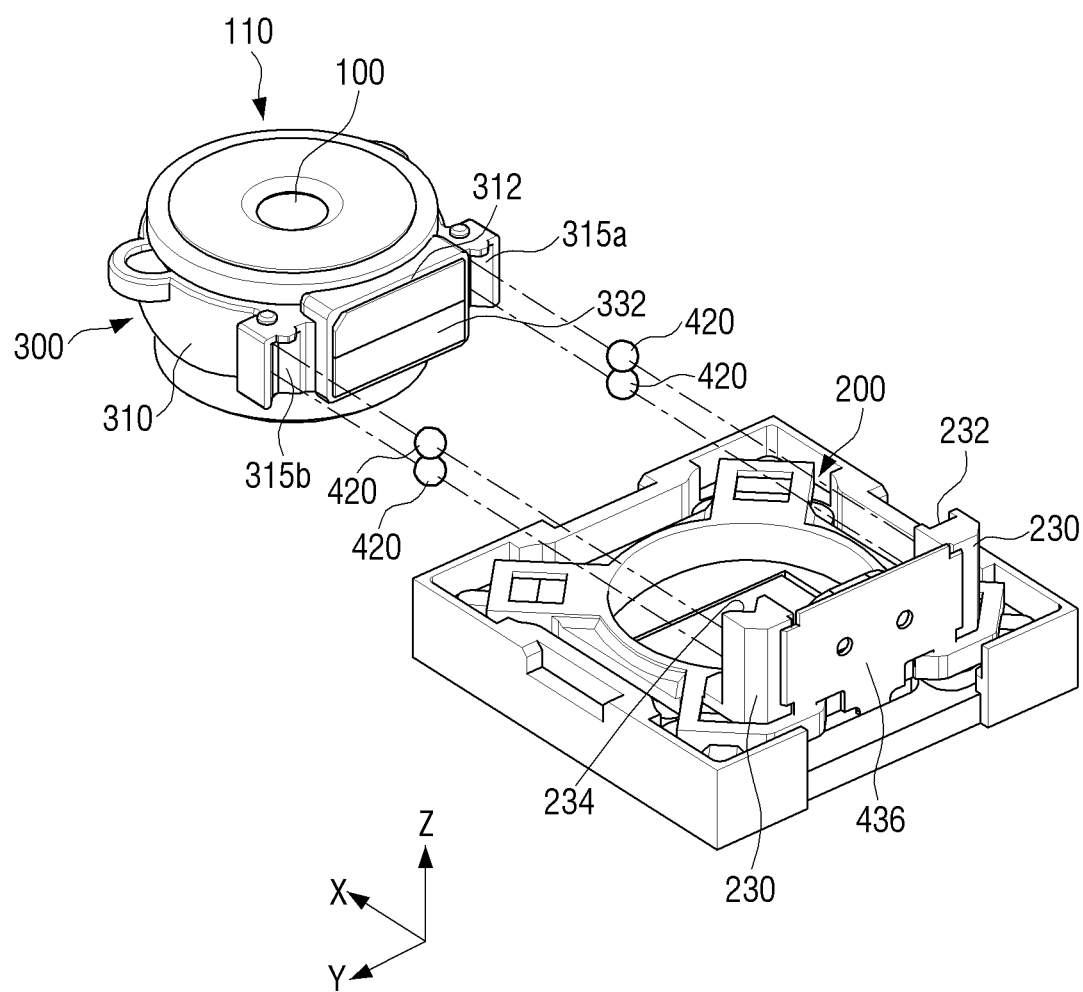
FIG. 5 is a view illustrating a combining of a first driver and a second driver of the optical adjusting apparatus of FIG. 1.
Figure 6:
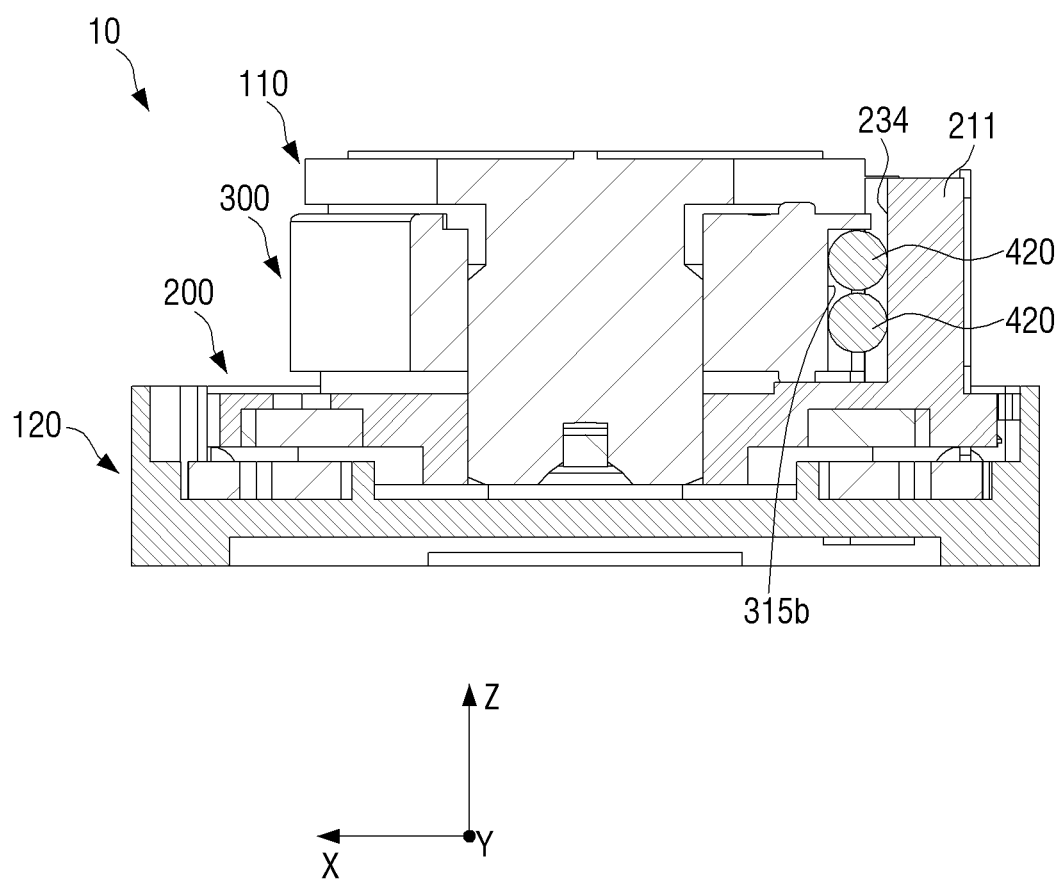
FIG. 6 is a cross-sectional view illustrating an arrangement of a second ball bearing of the optical adjusting apparatus of FIG. 1.

FIG. 5 is a view illustrating a combining of the first driver 200 and the second driver 300 of the optical adjusting apparatus 10 of FIG. 1, and FIG. 6 is a cross-sectional view illustrating an arrangement of the second ball bearing 420 of the optical adjusting apparatus 10 of FIG. 1.

Referring to FIGS. 5 and 6, the second driver 300 is mounted on the first driver 200 such that it can slide in the second direction (Z axis direction) with the lens barrel 110 accommodating the optical adjusting lens 100 mounted thereon. Herein, between the first driver 200 and the second driver 300, four second ball bearings 420 are disposed as aforementioned.

The four second ball bearings 420 are slidably mounted, two on the plane groove 232 and the other two on the V-shaped groove 234, and also contact two second ball bearing contacts 315a, 315b formed in the auto focusing base 310 of the second driver 300. Referring to FIG. 6, it can be seen that two second ball bearings 420 contact and support the second ball bearing contacts 315a, 315b. The second ball bearing contacts 315a, 315b may have a plane shape or a V-shape corresponding to the respective plane groove 232 and V-shaped groove 234. For example, second ball bearing contact 315a, illustrated in FIG. 5 as corresponding to the plane groove 232, may be formed with a plane shape, while second ball bearing contact 315b, illustrated in FIG. 5 as corresponding to the V-shaped groove 234, may be formed with a V-shape.

Accordingly, when performing an auto focusing, the four second ball bearings 420 support the rear surface of the second driver 300 opposite the front surface of the first driver 200 so as to be slidably movable in the second direction (Z axis direction).

As such, when performing an image stabilization or auto focusing in the present exemplary embodiment, sliding of the first and second drivers 200 and 300 may be made through a plurality of ball bearings without any additional suspension, thereby resolving the problem of deterioration of apparatus performance due to the use of conventional suspension wires, large current consumption, and deterioration of resolution etc. It will also be understood that the present general inventive concept is not necessarily limited to ball bearings, and that any similar bearing may be used in place of the plurality of ball bearings, depending on the particular embodiment.

Although not illustrated, the optical adjusting apparatus 10 illustrated in FIGS. 1-6 may be included in an image capturing apparatus, such as for example a camera or a smartphone. The image capturing apparatus may include a frame (not illustrated) to support the base 120, first driver 200, and second driver 300, and maintain the respective locations and orientations of these elements.

Figure 7:
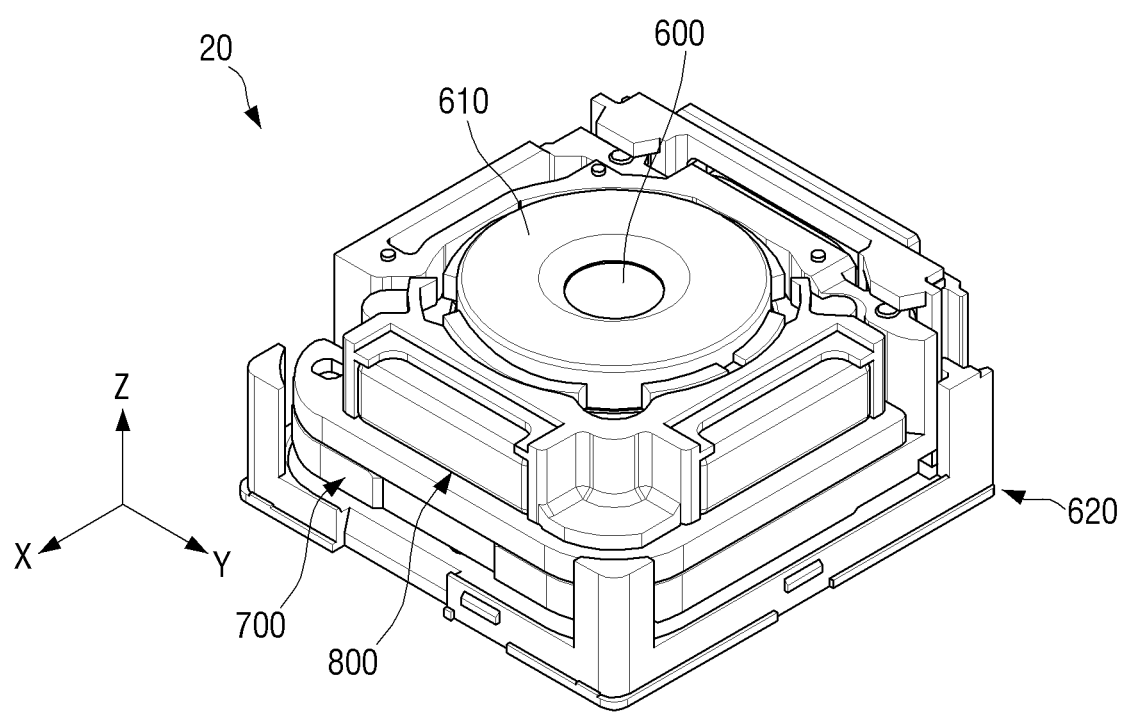
FIG. 7 is a skewed view of an optical adjusting apparatus according to an exemplary embodiment of the present general inventive concept.
Figure 8:
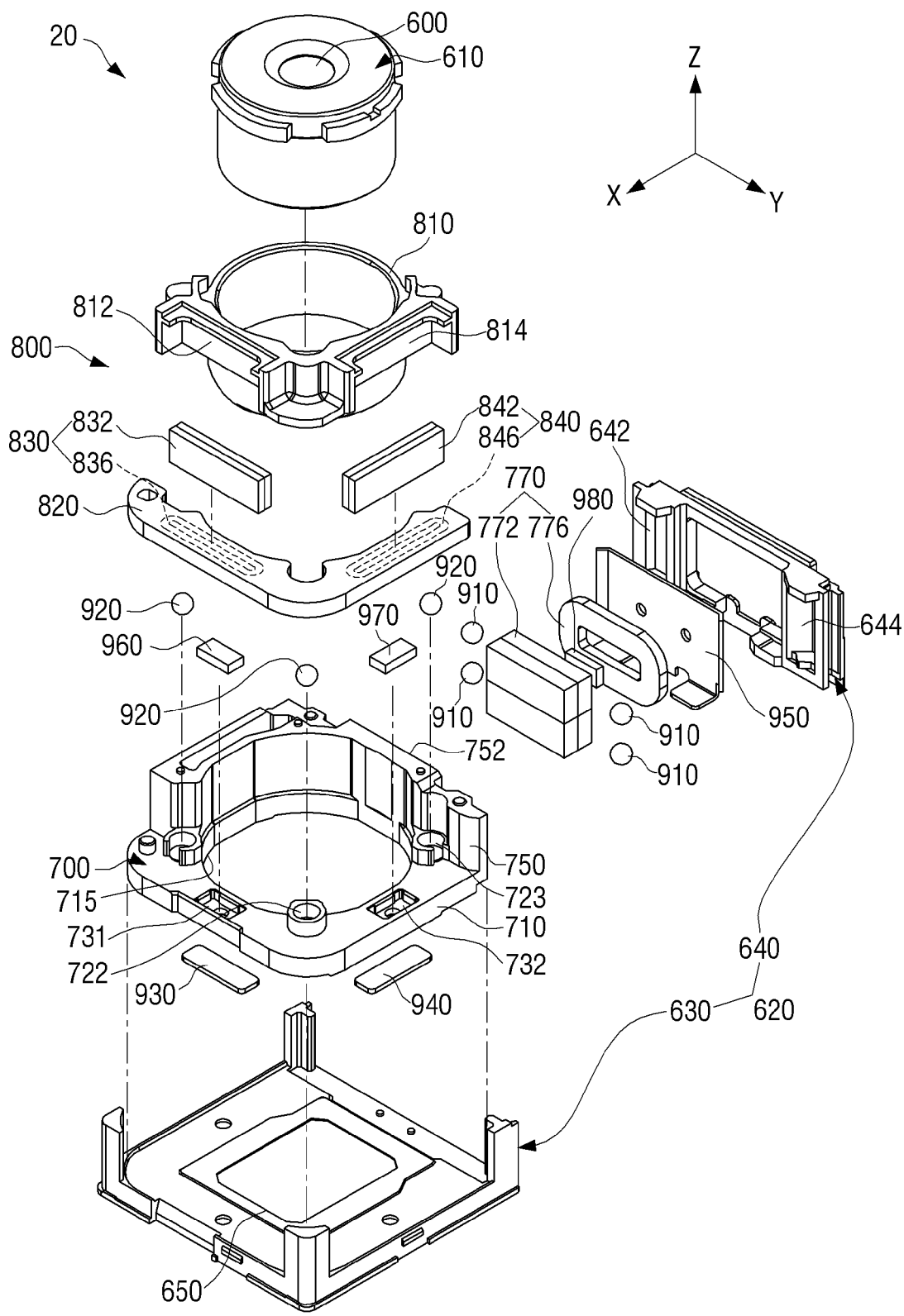
FIG. 8 is an exploded skewed view of the optical adjusting apparatus of FIG. 7.

FIG. 7 is a skewed view of an optical adjusting apparatus 20 according to an exemplary embodiment of the present general inventive concept, and FIG. 8 is an exploded skewed view of the optical adjusting apparatus 20 of FIG. 7. In the exemplary embodiment illustrated in FIGS. 7-12 and described herein, the "first direction" is defined as the optical axis direction (Z axis direction), and the "second direction" is defined as along the X-Y plane.

Referring to FIGS. 7 and 8, the optical adjusting apparatus 20 includes an optical adjusting lens 600, a lens barrel 610, a base 620, a first driver 700, a second driver 800, a first ball bearing 910, and a second ball bearing 920.

In the present exemplary embodiment, repeated explanations on the configurations either same or similar to the configurations of the aforementioned exemplary embodiments are omitted. Hereinbelow is explanation mainly focusing on the differences from the aforementioned exemplary embodiments.

The optical adjusting lens 600 is practically the same as the aforementioned optical adjusting lens 100, and thus detailed explanation is omitted.

The lens barrel 610 is moveable in the first direction (Z axis direction) that is the optical axis direction (Z axis direction) and in the second direction (along the X-Y plane) that is perpendicular to the optical axis direction (Z axis direction) while accommodating the optical adjusting lens 600.

The base 620 supports the first driver 700 so as to be moveable in the first direction (Z axis direction). Such a base 620 may include a lower base 630 and a side base 640.

The lower base 630 forms a bottom of the optical adjusting apparatus 20. In the lower base 630, there is formed a first penetrating hole 650 which can be penetrated by light that has penetrated the optical adjusting lens 600 of the lens barrel 610.

The side base 640 forms one surface of the optical adjusting apparatus 20. The side base 640 is combined with one side of the lower base 630 by means of screw fastening etc. In the side base 640, a plurality of first ball bearing accommodating grooves 642, 644 are formed. These second ball bearing accommodating grooves 642, 644 are distanced from one another by a predetermined distance, and include first and second grooves 642, 644 that extend along the optical axis direction (Z axis direction). One of the first and second grooves 642, 644 may be a plane groove and the other may be a V-shaped groove.

The first driver 700 supports the second driver 800 so as to be moveable in the second direction (along the X-Y plane). In addition, during an auto focusing, the first driver 700 itself moves in the first direction (Z axis direction) that is the optical axis direction (Z axis direction) together with the second driver 800. Such a first driver 700 may include an auto focusing base 710, an auto focusing extender 750, and an auto focusing actuator 770.

The auto focusing base 710 supports the lens barrel 610 so as to be moveable in the second direction (along the X-Y plane). In addition, during an auto focusing, the auto focus-ing base 710 itself moves along the first direction (Z axis direction) together with the lens barrel 610.

In such an auto focusing base 710, a second penetrating hole 715, a plurality of second ball bearing accommodating grooves 721, 722, and 723, and a plurality of detector mounting grooves 731, 732 are formed.

The second penetrating hole 715 is formed in a center of an inner surface of the auto focusing base 710 so that it may be penetrated by light that penetrated the optical adjusting lens 600.

The plurality of second ball bearing accommodating grooves 721, 722, and 723 slidably accommodate the plurality of second ball bearings 920. In the present exemplary embodiment, there are three second ball bearings 920, and thus there are also three second ball bearing accommodating grooves 721, 722, and 723 corresponding thereto.

On the plurality of detector mounting grooves 731, 732, a first and second detector 970, 980 that will be explained hereinafter are mounted. Accordingly, in the present exemplary embodiment, a first and second detector mounting groove 731, 732 are formed. In addition, on a bottom of the auto focusing base 710, a plurality of yoke mounting grooves (not illustrated) where a first and second yoke 940, 950 that will be explained hereinafter are mounted below the detector mounting grooves 731, 732.

The auto focusing extender 750 extends perpendicularly to the optical axis direction (Z axis direction) from the auto focusing base 710. On one side of the auto focusing extender 750, an auto focusing magnet 772 that will be explained hereinafter is mounted.

The auto focusing actuator 770 may include an auto focusing magnet 772 and an auto focusing driver 776.

As mentioned above, the auto focusing magnet 772 is mounted on one surface 752 of the auto focusing extender 750.

The auto focusing driver 776 is disposed in a location opposite the auto focusing magnet 772, and is mounted on the side base 640 of the base 620. More specifically, the auto focusing driver 776 is disposed on a rear side of the auto focusing magnet 772.

The auto focusing driver 776 is made of coil that may receive current from outside the optical adjusting apparatus 20 and generate electromagnetic force. Accordingly, the auto focusing driver 776 performs electromagnetic interaction with the auto focusing magnet 772.

Accordingly, the auto focusing actuator 770 may provide driving power in the first direction (Z axis direction) that is the optical axis direction (Z axis direction) and move the lens barrel 610, first driver 700, and second driver 800 in the Z axis direction.

The second driver 800 moves the lens barrel 610 accommodating the optical adjusting lens 600 in the second direction (along the X-Y plane) that is perpendicular to the first direction (Z axis direction). Such a second driver 800 may include an image stabilization base 810, driver accommodating member 820, and a plurality of image stabilization actuators.

On the image stabilization base 810, the lens barrel 610 where the optical adjusting lens 600 is mounted is mounted. The image stabilization base 810 moves in the second direction (along the X-Y plane) by driving of the plurality of image stabilization actuators.

The driver accommodating member 820 accommodates the first and second image stabilization driver 836, 846 that will be explained hereinafter, and is mounted on an upper surface of the auto focusing base 710 of the first driver 700.

The plurality of image stabilization actuators may include a first image stabilization actuator 830 and second image stabilization actuator 840.

The first image stabilization actuator 830 may include a first image stabilization magnet 832 and a first image stabilization driver 836.

The first image stabilization magnet 832 is mounted on the first image stabilization magnet mounting groove 812 formed in the image stabilization base 810.

The first image stabilization driver 836 is disposed in a location opposite the first image stabilization magnet 832. More specifically, the first image stabilization driver 836 is disposed on a back part of the first image stabilization magnet 832. The first image stabilization driver 836 is made of coil that receives current from outside the optical adjusting apparatus 20 and generates electromagnetic force. Accordingly, the first image stabilization driver 836 performs electromagnetic interaction with the first image stabilization magnet 832.

The second image stabilization actuator 840 may include a second image stabilization magnet 842 and second image stabilization driver 846.

The second image stabilization magnet 842 is mounted on the second image stabilization magnet mounting groove 814 formed in the image stabilization base 810. The second image stabilization magnet 842 may be disposed asymmetrically to the first image stabilization magnet 832.

The second image stabilization driver 846 may be made of coil that may receive current from outside the optical adjusting apparatus 20 and generate electromagnetic force as in the first image stabilization driver 836. Accordingly, the second image stabilization driver 836 performs electromagnetic interaction with the second image stabilization magnet 842.

Herein, the first image stabilization driver 836 and second image stabilization driver 846 are made of printing coil, and are formed in the driver accommodating member 820 mentioned above. Meanwhile, the first image stabilization driver 836 and second image stabilization driver 846 are general driving coil and not printing coil, and may be mounted on an upper surface of the auto focusing base 710 of the first driver 700 without an additional driver accommodating member.

In the present exemplary embodiment, since there is provided an auto focusing actuator 770 that controls movement of the first direction (Z axis direction) and a first and second image stabilization actuator 830, 840 which control movement in the X axis direction and the Y axis direction (the second direction), it is possible to independently control each actuator, and thus provide driving power regarding each direction (X axis, Y axis, and Z axis direction) independently from one another.

The first ball bearing 910 is provided in plural and is disposed between the base 620 and the first driver 700. In the present exemplary embodiment, the explanation is made based on the limitation that there are four first ball bearings 910. However, as in the aforementioned exemplary embodiment, there must be at least three first ball bearings 910.

The four first ball bearings 910 are slidably mounted, two on each of the first and second grooves 642, 644 of the side base 640. Accordingly, the four first ball bearings 910 slidably support the rear surface of the auto focusing extender 750 of the first driver 700 opposite the front surface of the side base 640.

Therefore, during an auto focusing, the optical adjusting apparatus 20 according to the present exemplary embodiment may move the first driver 700 in the first direction (Z axis direction) that is the optical axis direction (Z axis direction) to move the second driver 800 in the lens barrel 610 or optical axis direction (Z axis direction), thereby performing an auto focusing.

The second ball bearing 920 is provided in plural and is disposed between the first driver 700 and the second driver 800. In the present exemplary embodiment, the explanation is made based on the limitation that there are three the second ball bearings 920. As in the aforementioned exemplary embodiment, there should be at least three second ball bearings 920, and thus there may also be four or more second ball bearings 920.

Each of the three second ball bearings 920 is mounted so as to be slidably movable on three second ball bearing accommodating grooves 721, 722, 723, respectively, formed in the auto focusing base 710 of the first driver 700. Accordingly, the three second ball bearings 920 slidably support the bottom of the second driver 800 opposite the upper surface of the auto focusing base 10, which is the bottom of the image stabilization base 810.

Therefore, when a hand trembling occurs, in the optical adjusting apparatus 20 according to the present exemplary embodiment, the image stabilization base 810 may move in the second direction (along the X-Y plane) to move the lens barrel 610 in the second direction (along the X-Y plane) as well, thereby performing an image stabilization so as to clarify the image from data obtained in the imaging element (not illustrated).

Meanwhile, the optical adjusting apparatus 20 may further include a plurality of yokes and a plurality of detectors.

The plurality of yokes may include a first yoke 930, a second yoke 940, and a third yoke 950.

The first yoke 930 is provided in the auto focusing base 710 of the first driver 700, and is disposed in a location opposite the first image stabilization magnet 832. The first yoke 930 and the first image stabilization 832 provide magnetic gravitation to each other.

The second yoke 940 is provided in the auto focusing base 710 of the first driver 700, and is disposed in a location opposite the second image stabilization magnet 842. The second yoke 940 and the second image stabilization magnet 842 provide magnetic gravitation to each other.

The third yoke 950 is provided in the side base 640 of the base 620, and is disposed in a location opposite the auto focusing magnet 772. The third yoke 950 and the auto focusing magnet 772 provide magnetic gravitation to each other.

Accordingly, the optical adjusting apparatus 20 may make the image stabilization base 810 of the second driver 800 closely contact the auto focusing base 710 of the first driver 700 and also make the image stabilization base 810 of the second driver 800 return to its initial location by the gravitation formed between the first to second yokes 930, 940 and the first image stabilization magnet 832 to second image stabilization magnet 842. In addition, the optical adjusting apparatus 20 may make the auto focusing base 710 of the first driver 700 closely contact the side base 640 of the base 620 and also make the auto focusing base 710 of the first driver 700 return to its initial location by the gravitation formed between the third yoke 950 and auto focusing magnet 772.

The plurality of detectors may include a first detector 960, a second detector 970 and a third detector 980.

The first detector 960 is mounted on the first detector mounting groove 731 of the auto focusing base 710, and is disposed opposite the first image stabilization magnet 832 with the first image stabilization driver 836 in between. The first detector 860 detects movement in the X axis direction that is included in the first direction (along the X-Y plane) of the lens barrel 610, and may include a hole sensor that senses change of size of current or voltage induced according to the intensity of the magnetic field.

The second detector 970 is provided in the second detector mounting groove 732 of the auto focusing base 710, and is disposed opposite the second image stabilization magnet 842 with the second image stabilization driver 846 in between. The second detector 970 detects movement in the Y axis direction that is included in the first direction (along the X-Y plane) of the lens barrel 610, and may include a hole sensor as in the first detector 960.

The third detector 980 is provided in the side base 640 of the base 820, and is disposed opposite the auto focusing magnet 772. The third detector 980 detects movement in the first direction (Z axis direction) that is the optical axis direction (Z axis direction) of the lens barrel 610, and may include a hole sensor as in the first and second detector 960, 970.

The optical adjusting apparatus 20 according to the present exemplary embodiment may control movement of the lens barrel 610 to desired locations based on the location of the lens barrel 610 detected in the first to third detectors 960, 970, and 980.

Hereinbelow is further detailed explanation of an arrangement of the plurality of first and second ball bearings 910, 920.

Figure 9:
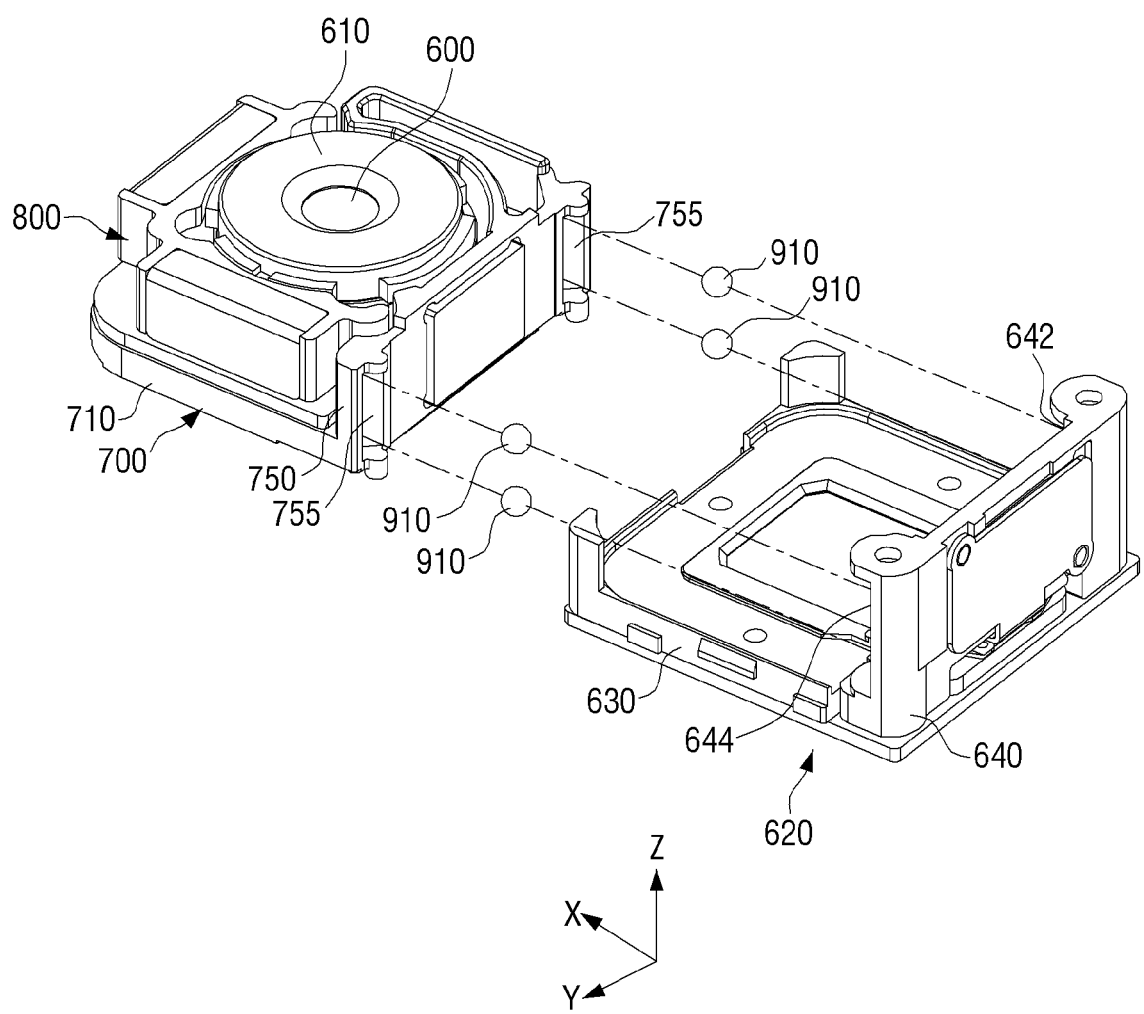
FIG. 9 is a view illustrating a combining of a base and a first driver of the optical adjusting apparatus of FIG. 7.
Figure 10:
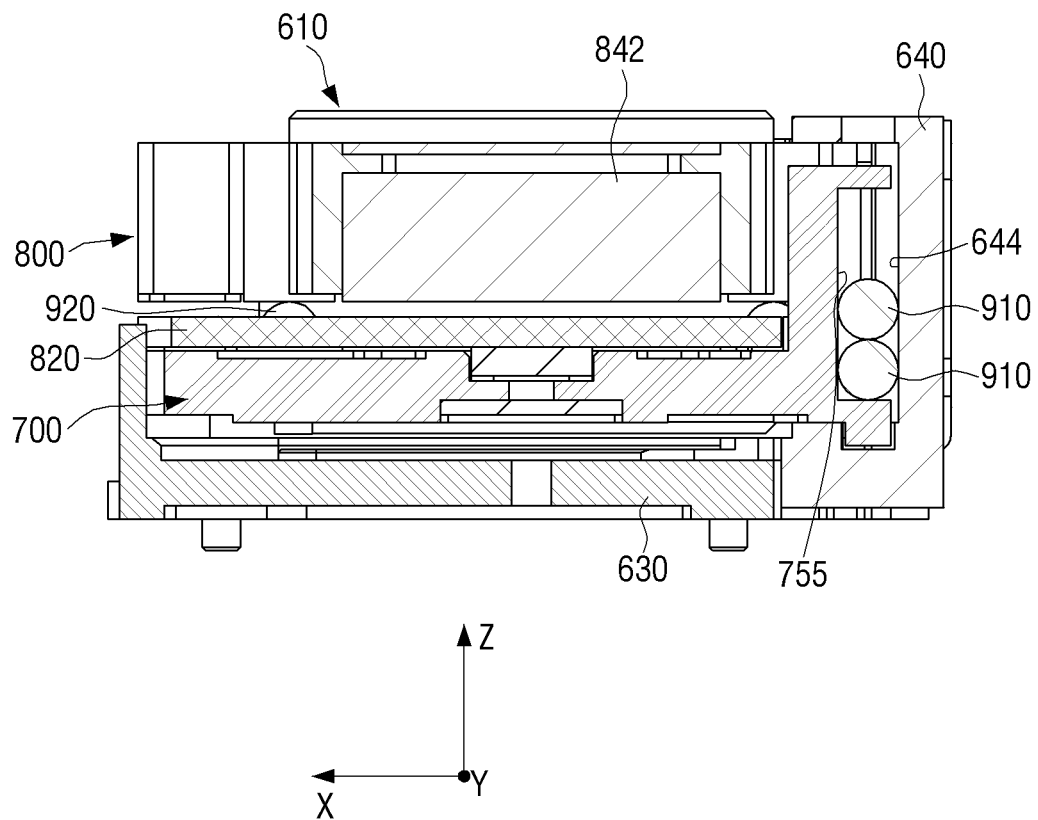
FIG. 10 is a cross-sectional view illustrating an arrangement of a first ball bearing of the optical adjusting apparatus of FIG. 7.

FIG. 9 is a view illustrating a combining of the base 620 and the first driver 700 of the optical adjusting apparatus 20 of FIG. 7, and FIG. 10 is a cross-sectional view illustrating an arrangement of the first ball bearing 910 of the optical adjusting apparatus 20 of FIG. 7.

Referring to FIGS. 9 and 10, the first driver 700 is mounted on the base 620 so as to be slidably movable in the first direction (Z axis direction) with the lens barrel 610 accommodating the first driver 700, second driver 800, and optical adjusting lens 600 mounted thereon. Herein, between the base 620 and the first driver 700, four first ball bearings 910 are disposed as aforementioned.

The four first ball bearings 910 are slidably mounted, two in each of the first and second grooves 642, 644 of the side base 640, and contact two first ball bearing contacts 755 formed in the auto focusing extender 750 of the first driver 700. Referring to FIG. 10, it can be seen that two first ball bearings 910 contact and support the first ball bearing contact 755. The first and second grooves 642, 644 may be formed as a plane groove and a V-shaped groove, similarly to the exemplary embodiment illustrated in FIGS. 1-6. Similarly, the two first ball bearing contacts 755 may be formed with corresponding plane shapes or V-shapes.

Accordingly, when performing an auto focusing, the four first ball bearings 910 support the rear surface of the first driver 700 opposite the front surface of the base 620 so as to be slidably movable in the first direction (Z axis direction).

Figure 11:
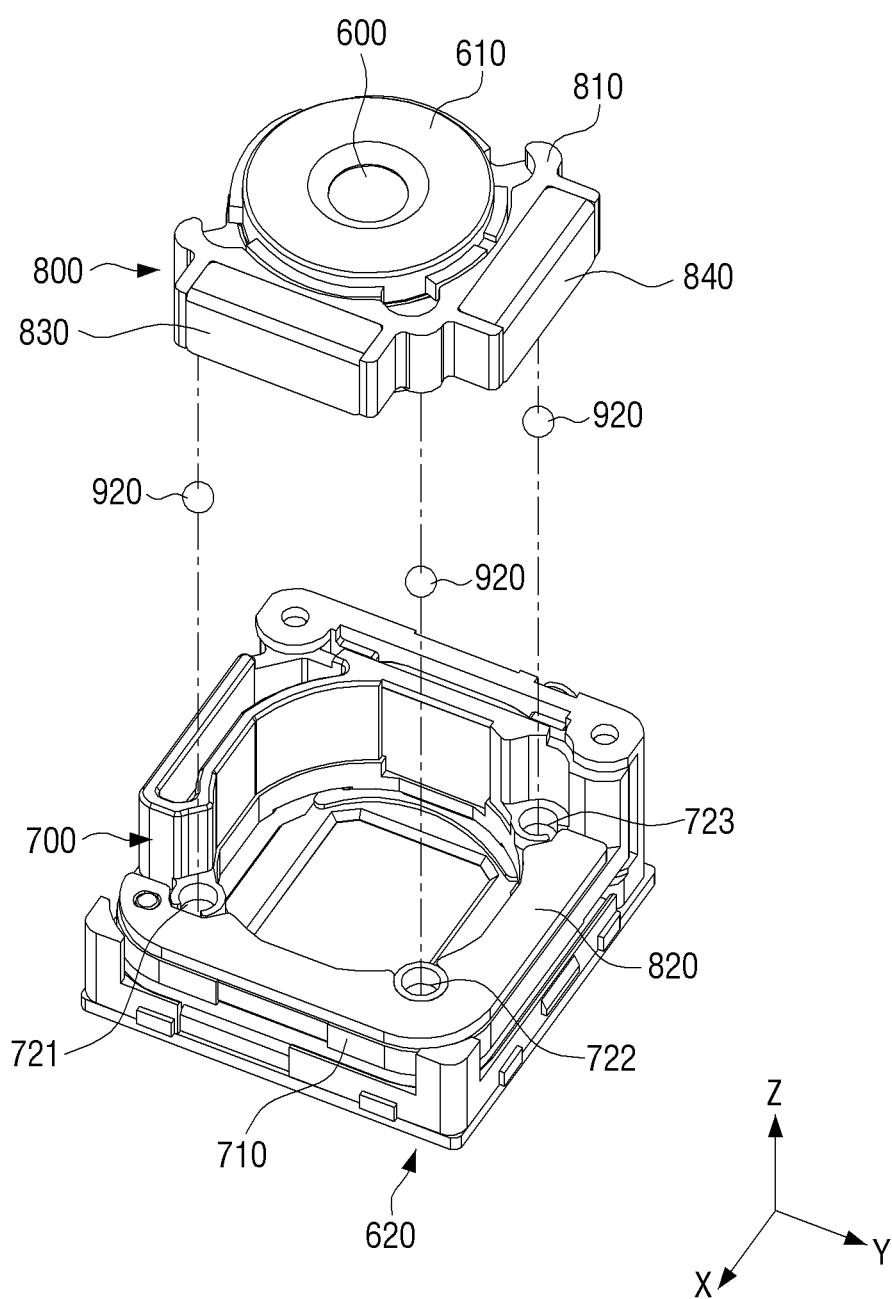
FIG. 11 is a view illustrating a combining of a first driver and a second driver of the optical adjusting apparatus of FIG. 7.
Figure 12:
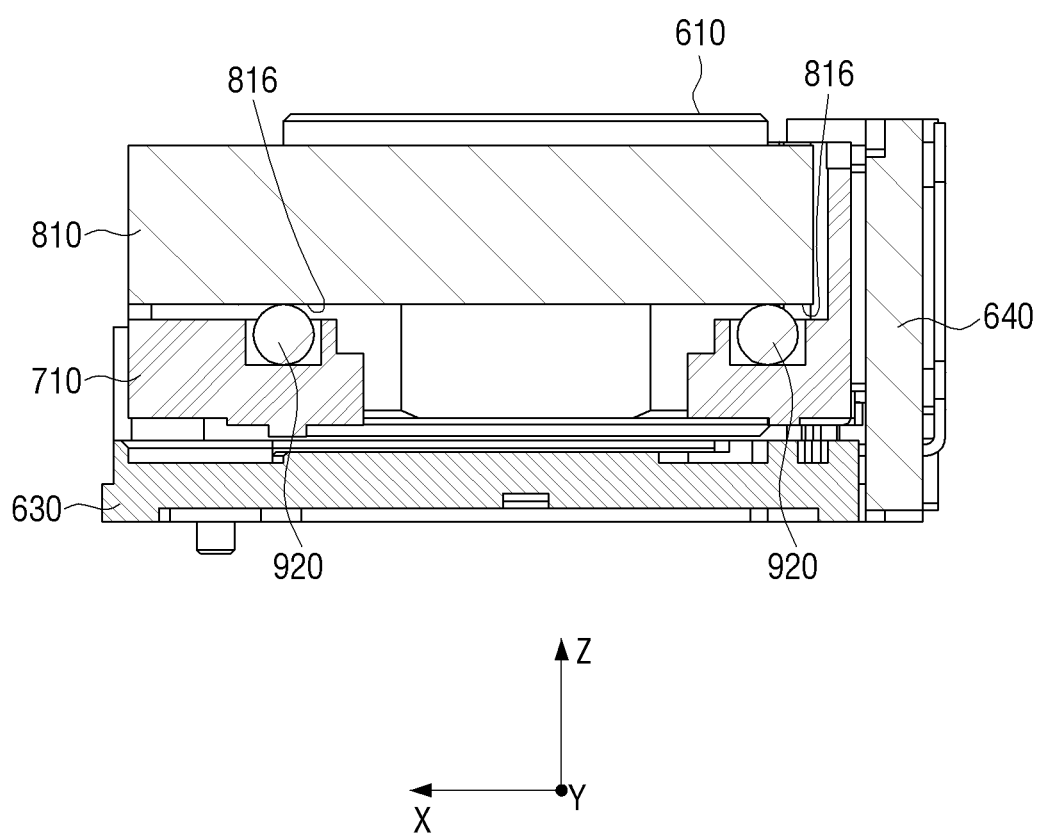
FIG. 12 is a cross-sectional view illustrating an arrangement of a second ball bearing of the optical adjusting apparatus of FIG. 7.

FIG. 11 is a view illustrating a combining of the first driver 700 and the second driver 800 of the optical adjusting apparatus 20 of FIG. 7, and FIG. 12 is a cross-sectional view illustrating an arrangement of the second ball bearing 920 of the optical adjusting apparatus 20 of FIG. 7.

Referring to FIGS. 11 and 12, the second driver 800 is mounted on the first driver 700 so as to be slidably movable in the second direction (along the X-Y plane) with the lens barrel 610 accommodating the optical adjusting lens 600 mounted thereon. Herein, between the first driver 700 and the second driver 800, three second ball bearings 920 are disposed as aforementioned. In FIG. 12, the driver accommodating member 820 and the first and second image stabilization actuators 830, 840 are omitted for clarity.

Each of the three second ball bearings 920 are slidably mounted on the three second ball bearing accommodating grooves 721, 722, and 723, and contact the bottom 816 of the image stabilization base 810. Referring to FIG. 12, it can be seen that the two second ball bearings 920 illustrated therein contact and support the bottom 816 of the image stabilization base 810.

Accordingly, when performing an image stabilization, the three second ball bearings 920 support the bottom of the second driver 800 opposite the upper surface of the first driver 700 so as to be slidably movable in the second direction (along the X-Y plane).

Similarly to the exemplary embodiment of the optical adjusting apparatus 10 illustrated in FIGS. 1-6, the exemplary embodiment of the optical adjusting apparatus 20 illustrated in 7-12 may also be included in an image capturing apparatus (not illustrated) such as for example a camera or a smartphone. The image capturing apparatus may include a frame (not illustrated) to support the base 620, first driver 700, and second driver 800, and maintain the respective locations and orientations of these elements.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An optical adjusting apparatus having an optical adjusting lens to perform image stabilization and auto focusing, the apparatus comprising:
   a base supporting a lens barrel on which the optical adjusting lens is mounted;
   a first driver to move the lens barrel in a first direction;
   a plurality of first ball bearings disposed between the base and the first driver that slidably supports the first driver for movement in the first direction;
   a second driver to move the lens barrel in a second direction that is perpendicular to the first direction; and
   a plurality of second ball bearings disposed between the first driver and the second driver that slidably supports the second driver for movement in the second direction.

2. The apparatus of claim 1, wherein the first driver is disposed between the base and the second driver.

3. The apparatus of claim 2, wherein the lens barrel is mounted on the second driver.

4. The apparatus of claim 3, wherein:
   the first direction is a direction perpendicular to an optical axis direction of the optical adjusting lens; and
   the second direction is the optical axis direction of the optical adjusting lens.

5. The apparatus of claim 4, wherein the first driver comprises:
   an image stabilization base to moveably support the second driver; and
   an image stabilization extender extending from the image stabilization base in the optical axis direction.

6. The apparatus of claim 5, wherein the plurality of first ball bearings are disposed between the image stabilization base and the base.

7. The apparatus of claim 6, wherein:
   a plurality of first ball bearing accommodating grooves to slidably accommodate the plurality of first ball bearings are formed in the base; and the first ball bearings slidably support one surface of the image stabilization base opposite a front surface of the base.

8. The apparatus of claim 5, wherein the plurality of second ball bearings are disposed between the second driver and the image stabilization extender.

9. The apparatus of claim 8, wherein:
a plurality of second ball bearing accommodating grooves that slidably accommodate the plurality of second ball bearings are formed in the image stabilization extender; and
the plurality of second ball bearings slidably support one surface of the second driver opposite a front surface of the image stabilization extender.

10. The apparatus of claim 9, wherein the plurality of second ball bearing accommodating grooves comprise:
a plane groove extending along the optical axis direction; and
a V-shaped groove distanced from the plane groove by a predetermined distance and extending along the optical axis direction.

11. The apparatus of claim 3, wherein the first direction is an optical axis direction of the optical adjusting lens, and the second direction is a direction perpendicular to the optical axis direction.

12. The apparatus of claim 11, wherein the first driver comprises:
an auto focusing base to moveably support the second driver; and
an auto focusing extender extending from the auto focusing base in the optical axis direction.

13. The apparatus of claim 12, wherein the base comprises:
a lower base; and
a side base extending from the lower base in the optical axis direction.

14. The apparatus of claim 13, wherein the plurality of first ball bearings are disposed between the auto focusing extender and the side base.

15. The apparatus of claim 14, wherein:
a plurality of first ball bearing accommodating grooves to slidably accommodate the plurality of first ball bearings are formed in the side base, and
the plurality of first ball bearings slidably support one surface of the auto focusing extender opposite a front surface of the side base.

16. The apparatus of claim 12, wherein the plurality of second ball bearings are disposed between the second driver and the auto focusing base.

17. The apparatus of claim 16, wherein:
a plurality of second ball bearing accommodating grooves to slidably accommodate the plurality of second ball bearings are formed in the auto focusing bearing, and
the plurality of second ball bearings slidably support one surface of the second driver opposite a front surface of the auto focusing base.

18. The apparatus of claim 1, wherein the number of the plurality of first ball bearings and the plurality of second ball bearings are at least three, respectively.

19. An optical adjustment apparatus, comprising:
a base;
a first driver mounted on the base, the first driver being slidably supported by a plurality of first ball bearings for movement in a first direction relative to the base;
a second driver mounted on the first driver and movable in the first direction with the first driver, the second driver being slidably supported by a plurality of second ball bearings for movement in a second direction relative to the base, the second direction being perpendicular to the first direction; and
an optical adjusting lens disposed on the second driver, the optical adjusting lens having an optical axis direction corresponding to one of the first and second directions.

20. An optical adjustment apparatus, comprising:
a base;
a lens barrel having a lens;
a first driver supported by the base;
a second driver supported by the first driver, the second driver supporting the lens barrel;
a first bearing disposed between the base and the first driver that slidably supports movement of the first driver in a first direction; and
a second bearing disposed between the first driver and the second driver that slidably supports movement of the second driver in a second direction.

21. The apparatus of claim 20, further comprising:
a first groove formed in a surface of the base in the first direction to accommodate the first bearing; and
a second groove formed in a surface of the first driver in the second direction to accommodate the second bearing.

22. The apparatus of claim 21, wherein:
the first groove comprises a plurality of first grooves formed in the surface of the base; and
at least one of the plurality of first grooves is configured to restrict movement of the first driver in the second direction.

23. The apparatus of claim 21, wherein:
the second groove comprises a plurality of second grooves formed in the surface of the first driver; and
at least one of the second grooves is configured to restrict movement of the second driver in the first direction.

24. The apparatus of claim 20, wherein:
the second direction is along an X-Y plane perpendicular to an optical axis of the lens; and
the second driver comprises:
a first actuator to control movement of the second driver along the X axis of the X-Y plane; and
a second actuator to control movement of the second driver along the Y axis of the X-Y plane.

25. The apparatus of claim 20, further comprising:
an actuator to control movement of the first driver in the first direction, the actuator controlling the movement of the first driver by interacting with a yoke disposed on the base.

26. The apparatus of claim 20, further comprising:
an actuator to control movement of the second driver in the second direction, the actuator controlling the movement of the second driver by interacting with a yoke disposed on the first driver.

27. The apparatus of claim 20, further comprising:
a first detector to detect movement of the first driver in the first direction, the first detector being disposed on the base; and
a second detector to detect movement of the second driver in the second direction, the second detector being disposed on the first driver.

28. The apparatus of claim 27, wherein:
the first direction is along an X-Y plane perpendicular to an optical axis of the lens; and
the first detector comprises a plurality of first detectors, one of the first detectors detecting movement of the first driver along the X axis of the X-Y plane, and another of the first detectors detecting movement of the first driver along the Y axis of the X-Y plane.

29. The apparatus of claim 27, wherein:
the second direction is along an X-Y plane perpendicular to an optical axis of the lens; and
the second detector comprises a plurality of second detectors, one of the second detectors detecting movement of the second driver along the X axis of the X-Y plane, and another of the second detectors detecting movement of the second driver along the Y axis of the X-Y plane.

* * * * *